(12) United States Patent
Goyal

(10) Patent No.: US 8,180,808 B2
(45) Date of Patent: May 15, 2012

(54) SPEND DATA CLUSTERING ENGINE WITH OUTLIER DETECTION

(75) Inventor: Ram Dayal Goyal, Bangalore (IN)

(73) Assignee: Ketera Technologies, Inc., Santa Clara, CA (US)

( * ) Notice: Subject to any disclaimer, the term of this patent is extended or adjusted under 35 U.S.C. 154(b) by 1053 days.

(21) Appl. No.: 12/029,491

(22) Filed: Feb. 12, 2008

(65) Prior Publication Data
US 2008/0306788 A1    Dec. 11, 2008

(30) Foreign Application Priority Data
Jun. 8, 2007 (IN) ............................ 1188/CHE/2007

(51) Int. Cl.
G06F 17/30 (2006.01)
G06Q 40/00 (2012.01)

(52) U.S. Cl. ........................................ 707/803; 705/42
(58) Field of Classification Search .................. None
See application file for complete search history.

(56) References Cited

U.S. PATENT DOCUMENTS

| 6,336,082 | B1* | 1/2002 | Nguyen et al. | 702/179 |
| 7,747,480 | B1* | 6/2010 | Agresta et al. | 705/28 |
| 2005/0149522 | A1* | 7/2005 | Cookson et al. | 707/7 |
| 2005/0286767 | A1* | 12/2005 | Hager et al. | 382/190 |
| 2007/0198404 | A1* | 8/2007 | Hirka et al. | 705/39 |
| 2008/0114644 | A1* | 5/2008 | Frank et al. | 705/14 |
| 2009/0198688 | A1* | 8/2009 | Venkataraman et al. | 707/5 |

* cited by examiner

Primary Examiner — Tarek Chbouki
(74) Attorney, Agent, or Firm — Ash Tankha; Lipton, Weinberger & Husick

(57) ABSTRACT

Disclosed herein is a computer implemented method and system for grouping spend items in a list of said spend items, and for detecting outliers. The spend items entered into the spend database are phonetically sorted and grouped into second level clusters by the spend data clustering engine. In the first level of clustering, first level clusters are created by matching the spend items using generated word tokens and sorted sound codes. The unique spend items, in the list generated after first level clustering, are further matched to create second level clusters. The first level clusters are updated based on the second level of clustering. In order to determine discrepancies in clustering and spend, statistically deviating outliers are detected in each second level cluster. This engine provides clustering at configurable levels of accuracy. The engine's specific combination of word token and sound code matching provides accurate results for spend items.

21 Claims, 17 Drawing Sheets

1. Assign ClusterId of all records, same as their RecordId.
2. PrototypeIndex = 0;
3. Write Prototype record in FurtherMatchFile, sort its sound code and write its item description also.
4. Current Index = 1;
5. PrototypeRecordId = RecordId of Item at PrototypeIndex
6. While there are more records
   a. CurrentItem = Line item at location Current Index
   b. PrototypeItem = Line item at location PrototypeIndex
   c. match = MatchingUsingTokensCriteria (PrototypeItem, CurrentItem)
   d. If match is true
      i. Update ClusterId of Current Item to PrototypeRecordId
      ii. CurrentIndex++
   e. Else
      i. match = FuzzyMatch(PrototypeItem, CurrentItem, PrototypeItemSoundCode, CurrentItemSoundCode)
      ii. If match is true
         a. Update ClusterId of Current Item to PrototypeRecordId
         b. CurrentIndex++
      iii. Else
         a. PrototypeIndex = CurrentIndex
         b. CurrentIndex++
         c. Write Prototype record in FurtherMatchFile with its item description and sorted sound codes.
7. Sort records in FurtherMatchFile based on sorted sound code.

FIGURE 3A

MatchingUsingTokensCriteria (ItemDesc1, ItemDesc2)

1. Parse both items using space as delimiters.
2. If both have only one token and if they are the same, return matching; else return not matching.
3. Perform the following for given accuracy level criteria

Case1: Level =Low
   First 2 words of both item descriptions should be the same.

Case2: Level =Medium
   First 2 words and at least one of the remaining words of both items should be the same.

Case3: Level =High
   Either first 3 words should be the same, or
   first 2 words and at least 2 of remaining words of both items should be the same.

FIGURE 3C

FuzzyMatch(ItemDesc1, ItemDesc2, SoundCode S1, SoundCode S2)

1. If ItemDesc1 is the same as ItemDesc2, return matching;
2. If length of either ItemDesc1 or ItemDesc2 is less than 4, return not matching;
3. Find LD = Levenshtein Distance between S1 and S2
4. PrefixScore = Length of matching prefix of both items/length of larger ItemDesc
5. SoundScore = Length of matching prefix of S1, S2
6. LDScore = 1-2*LD/length of larger ItemDesc
7. FinalScore = Max(PrefixScore, SoundScore, LDScore);
8. If FinalScore > MatchingScoreThreshold
    a. Return true;
9. Else
    a. Return false;

FIGURE 3D

For the unique records in FurtherMatchFile, perform the following:
1. PrototypeIndex = 0;
2. Current Index = 1;
3. PrototypeItem = Item at location PrototypeIndex;
4. CurrentItem = Item at location CurrentIndex;
5. While there are more records a. match = MatchingUsingTokensCriteria (PrototypeItem, CurrentItem)
   b. If match is true
      i. Create map entry "CurrentItemRecordId→ PrototypeRecordId
      ii. CurrentIndex++
   c. Else
      i. match = FuzzyMatch(PrototypeItem, CurrentItem, PrototypeItemSoundCode, CurrentItemSoundCode)
      ii. If match is true
         a. Create map entry "CurrentItemRecordId→ PrototypeRecordId
         b. CurrentIndex++ iii. Else
         a. PrototypeIndex = CurrentIndex
         b. CurrentIndex ++

6. Read all the input records' ClusterId and if it is present in the map, change it with the new value from the map.

FIGURE 3E

Outlier detection

1. Find the median price of each cluster.
2. Set FrequentSupplierThreshold = 2.5 (configurable from outside)
3. Set NonFrequentSupplierThreshold = 3.5 (configurable from outside)
4. For each cluster traverse all line items in it and perform the following:
    a. Current Supplier's Frequency Fraction = Frequency of supplier/size of cluster;
    b. If frequency fraction > 0.5
        If (price > median)
            If (price/median > FrequentSupplierThreshold)
                flag it as outlier
        If (price < median)
            If (median/price > FrequentSupplierThreshold)
                flag it as outlier
    c. Else
        If (price > median)
            If (price/median > NonFrequentSupplierThreshold)
                flag it as outlier
        If (price < median)
            If (median/price > NonFrequentSupplierThreshold)
                flag it as outlier

FIGURE 4

Input Data

| RecID | Description | Supplier | Spend |
|---|---|---|---|
| 1 | PUMP SUBMERSIBLE 8.0KW HT 1000V FLYGT | s1 | 2046 |
| 2 | PUMP SBMRSBLE 8.0KW 1000V | s2 | 3349 |
| 3 | FLUID AUTO TRANSMISSION/HYD TO-430 BULK | s3 | 4891 |
| 4 | OIL HYDRAULIC HV1100 BULK 2536000 | s4 | 3514 |
| 5 | ADAPTER PLASSON 110MM F X 4.00IN FLANGE | s5 | 110 |
| 6 | COUPLING PLASSON 63MM FXF | s6 | 58.7 |
| 7 | BUSH 20803308 TAMROCK | s6 | 74.1 |
| 8 | GREASE CEPLATTYN KG10HMF1000 BULKA BIN | s7 | 4289 |
| 9 | OIL POWERGEAR 25L DRUM | s7 | 35.7 |
| 10 | BOLT HEX M16 X 120MM 2.00P GR8.8 BLACK | s8 | 17.5 |
| 11 | BOLT HEX M20 X 100MM 2.50P GR8.8 BLACK | s8 | 62.9 |
| 12 | HEX BOLT M16 X 50MM 2.00P GR8.8 NO NUT | s8 | 41.5 |
| 13 | HEX BOLT M12 X 50MM 1.75P GR8.8 NO NUT | s8 | 271 |
| 14 | HAMMER WELDER S CHIPPING SPRING HANDLE | s9 | 20.5 |
| 15 | BUCKLE BAND-IT STRAP 5/8IN 201SS BOX/100 | s9 | 23.6 |
| 16 | COUPLING MINSUP SURELOCK MALE 25MM | s10 | 52.8 |
| 17 | FLUID AUTO TRANSMISION BULK | s10 | 3803 |
| 18 | SCREW SKT HD CSK M16 2.00P 50MM LG 12.9 | s11 | 168 |
| 19 | SCREW SKT M16 2.00P | s11 | 190 |
| 20 | PAINT DYMARK SPRAY WRITER YELLOW 360DEG | s11 | 23.9 |

FIGURE 5A

After first level clustering

| RecID | Description | SoundToken | Supplier | Spend | ClusterID |
|---|---|---|---|---|---|
| 5 | ADAPTER PLASSON 110MM F X 4.00IN FLANGE | ADPTR FLNG PLXN | s5 | 110.03 | 5 |
| 15 | BUCKLE BAND-IT STRAP 5/8IN 201SS BOX/100 | BKL BND STRP | s9 | 23.64 | 15 |
| 10 | BOLT HEX M16 X 120MM 2.00P GR8.8 BLACK | BLK BLT HEX | s8 | 17.54 | 10 |
| 11 | BOLT HEX M20 X 100MM 2.50P GR8.8 BLACK | BLK BLT HEX | s8 | 62.85 | 10 |
| 7 | BUSH 20803308 TAMROCK | BUX TMRK | s6 | 74.1 | 7 |
| 16 | COUPLING MINSUP SURELOCK MALE 25MM | CPLNG ML MNSP SRLK | s10 | 52.84 | 16 |
| 6 | COUPLING PLASSON 63MM FXF | CPLNG PLXN | s6 | 58.69 | 6 |
| 17 | FLUID AUTO TRANSMISION BULK | ATO BLK FLUD TRNSMXN | s10 | 1802.9 | 17 |
| 3 | FLUID AUTO TRANSMISSION/HYD TO-430 BULK | ATO BLK FLUD HID TRNSMXN | s3 | 4891.14 | 17 |
| 8 | GREASE CEPLATTYN KG10HMF1000 BULKA BIN | BIN BLK CPLTIN GRS | s7 | 4289.05 | 8 |
| 12 | HEX BOLT M16 X 50MM 2.00P GR8.8 NO NUT | BLT HEX NUT | s8 | 41.46 | 12 |
| 13 | HEX BOLT M12 X 50MM 1.75P GR8.8 NO NUT | BLT HEX NUT | s8 | 270.82 | 12 |
| 14 | HAMMER WELDER S CHIPPING SPRING HANDLE | HMR HNDL SPRNG WLDR XPNG | s9 | 20.46 | 14 |
| 4 | OIL HYDRAULIC HV1100 BULK 2536000 | BLK HIDRLK OIL | s4 | 3513.75 | 4 |
| 9 | OIL POWERGEAR 25L DRUM | DRM OIL PWRGR | s7 | 35.69 | 9 |
| 2 | PUMP SBMRSBLE 8.0KW 1000V | PMP SBMRSBL | s2 | 3348.97 | 2 |
| 1 | PUMP SUBMERSIBLE 8.0KW HT 1000V FLYGT | FLIT PMP SBMRSBL | s1 | 2046.12 | 2 |
| 20 | PAINT DYMARK SPRAY WRITER YELLOW 360DEG | DEG DIMRK PNT SPRI WRTR YLW | s11 | 23.88 | 20 |
| 19 | SCREW SKT M16 2.00P | SKRW SKT | s11 | 190.32 | 19 |
| 18 | SCREW SKT HD CSK M16 2.00P 50MM LG 12.9 | CSK SKRW SKT | s11 | 167.81 | 19 |

FIGURE 5B

Unique records after first level clustering:

| RecID | Description | SoundToken | Supplier | Spend | ClusterID |
|---|---|---|---|---|---|
| 5 | ADAPTER PLASSON 110MM F X 4.00IN FLANGE | ADPTR FLNG PLXN | s5 | 110.03 | 5 |
| 17 | FLUID AUTO TRANSMISION BULK | ATO BLK FLUD TRNSMXN | s10 | 1802.9 | 17 |
| 8 | GREASE CEPLATTYN KG10HMF1000 BULKA BIN | BIN BLK CPLTIN GRS | s7 | 4289.05 | 12 |
| 15 | BUCKLE BAND-IT STRAP 5/8IN 201SS BOX/100 | BKL BND STRP | s9 | 23.64 | 15 |
| 10 | BOLT HEX M16 X 120MM 2.00P GR8.8 BLACK | BLK BLT HEX | s8 | 17.54 | 10 |
| 4 | OIL HYDRAULIC HV1100 BULK 2536000 | BLK HIDRLK OIL | s4 | 3513.75 | 4 |
| 12 | HEX BOLT M16 X 50MM 2.00P GR8.8 NO NUT | BLT HEX NUT | s8 | 41.46 | 12 |
| 7 | BUSH 20803308 TAMROCK | BUX TMRK | s6 | 74.1 | 7 |
| 16 | COUPLING MINSUP SURELOCK MALE 25MM | CPLNG ML MNSP SRLK | s10 | 52.84 | 16 |
| 6 | COUPLING PLASSON 63MM FXF | CPLNG PLXN | s6 | 58.69 | 6 |
| 20 | PAINT DYMARK SPRAY WRITER YELLOW 360DEG | DEG DIMRK PNT SPRI WRTR YLW | s11 | 23.88 | 20 |
| 9 | OIL POWERGEAR 25L DRUM | DRM OIL PWRGR | s7 | 35.69 | 9 |
| 14 | HAMMER WELDER S CHIPPING SPRING HANDLE | HMR HNDL SPRNG WLDR XPNG | s9 | 20.46 | 14 |
| 2 | PUMP SBMRSBLE 8.0KW 1000V | PMP SBMRSBL | s2 | 3348.97 | 2 |
| 19 | SCREW SKT M16 2.00P | SKRW SKT | s11 | 190.32 | 19 |

FIGURE 5C

After second level clustering:

| RecID | Description | SoundToken | Supplier | Spend | ClusterID |
|---|---|---|---|---|---|
| 5 | ADAPTER PLASSON 110MM F X 4.00IN FLANGE | ADPTR FLNG PLXN | s5 | 110.03 | 5 |
| 17 | FLUID AUTO TRANSMISION BULK | ATO BLK FLUD TRNSMXN | s10 | 1802.9 | 17 |
| 8 | GREASE CEPLATTYN KG10HMF1000 BULKA BIN | BIN BLK CPLTIN GRS | s7 | 4289.05 | 8 |
| 15 | BUCKLE BAND-IT STRAP 5/8IN 201SS BOX/100 | BKL BND STRP | s9 | 23.64 | 15 |
| 10 | BOLT HEX M16 X 120MM 2.00P GR8.8 BLACK | BLK BLT HEX | s8 | 17.54 | 10 |
| 4 | OIL HYDRAULIC HV1100 BULK 2536000 | BLK HIDRLK OIL | s4 | 3513.75 | 4 |
| 12 | HEX BOLT M16 X 50MM 2.00P GR8.8 NO NUT | BLT HEX NUT | s8 | 41.46 | 10 |
| 7 | BUSH 20803308 TAMROCK | BUX TMRK | s6 | 74.1 | 7 |
| 16 | COUPLING MINSUP SURELOCK MALE 25MM | CPLNG ML MNSP SRLK | s10 | 52.84 | 16 |
| 6 | COUPLING PLASSON 63MM FXF | CPLNG PLXN | s6 | 58.69 | 6 |
| 20 | PAINT DYMARK SPRAY WRITER YELLOW 360DEG | DEG DIMRK PNT SPRI WRTR YLW | s11 | 23.88 | 20 |
| 9 | OIL POWERGEAR 25L DRUM | DRM OIL PWRGR | s7 | 35.69 | 9 |
| 14 | HAMMER WELDER S CHIPPING SPRING HANDLE | HMR HNDL SPRNG WLDR XPNG | s9 | 20.46 | 14 |
| 2 | PUMP SBMRSBLE 8.0KW 1000V | PMP SBMRSBL | s2 | 3348.97 | 2 |
| 19 | SCREW SKT M16 2.00P | SKRW SKT | s11 | 190.32 | 19 |

FIGURE 5D

Data Sorted by final cluster id:

| RecID | Description | SoundToken | Supplier | Spend | ClusterID |
|---|---|---|---|---|---|
| 2 | PUMP SBMRSBLE 8.0KW 1000V | PMP SBMRSBL | s2 | 3348.97 | 2 |
| 1 | PUMP SUBMERSIBLE 8.0KW HT 1000V FLYGT | PMP SBMRSBL FLIT | s1 | 2046.12 | 2 |
| 4 | OIL HYDRAULIC HV1100 BULK 2536000 | OIL HIDRLK BLK | s4 | 3513.75 | 4 |
| 5 | ADAPTER PLASSON 110MM F X 4.00IN FLANGE | ADPTR PLXN FLNG | s5 | 110.03 | 5 |
| 6 | COUPLING PLASSON 63MM FXF | CPLNG PLXN | s6 | 58.69 | 6 |
| 7 | BUSH 20803308 TAMROCK | BUX TMRK | s6 | 74.1 | 7 |
| 8 | GREASE CEPLATTYN KG10HMF1000 BULKA BIN | GRS CPLTIN BLK BIN | s7 | 4289.05 | 8 |
| 9 | OIL POWERGEAR 25L DRUM | OIL PWRGR DRM | s7 | 35.69 | 9 |
| 10 | BOLT HEX M16 X 120MM 2.00P GR8.8 BLACK | BLT HEX BLK | s8 | 17.54 | 10 |
| 11 | BOLT HEX M20 X 100MM 2.50P GR8.8 BLACK | BLT HEX BLK | s8 | 62.85 | 10 |
| 12 | HEX BOLT M16 X 50MM 2.00P GR8.8 NO NUT | HEX BLT NUT | s8 | 41.46 | 10 |
| 13 | HEX BOLT M12 X 50MM 1.75P GR8.8 NO NUT | HEX BLT NUT | s8 | 270.82 | 10 |
| 14 | HAMMER WELDER S CHIPPING SPRING HANDLE | HMR WLDR XPNG SPRNG HNDL | s9 | 20.46 | 14 |
| 15 | BUCKLE BAND-IT STRAP 5/8IN 201SS BOX/100 | BKL BND STRP | s9 | 23.64 | 15 |
| 16 | COUPLING MINSUP SURELOCK MALE 25MM | CPLNG MNSP SRLK ML | s10 | 52.84 | 16 |
| 17 | FLUID AUTO TRANSMISION BULK | FLUD ATO TRNSMXN BLK | s10 | 1802.9 | 17 |
| 3 | FLUID AUTO TRANSMISSION/HYD TO-430 BULK | FLUD ATO TRNSMXN HID BLK | s3 | 4891.14 | 17 |
| 19 | SCREW SKT M16 2.00P | SKRW SKT | s11 | 190.32 | 19 |
| 18 | SCREW SKT HD CSK M16 2.00P 50MM LG 12.9 | SKRW SKT CSK | s11 | 167.81 | 19 |
| 20 | PAINT DYMARK SPRAY WRITER YELLOW 360DEG | PNT DIMRK SPRI WRTR YLW DEG | s11 | 23.88 | 20 |

FIGURE 5E

Outlier Detection:

| RecID | Description | SoundToken | Supplier | Spend | ClusterID | Outlier |
|---|---|---|---|---|---|---|
| 2 | PUMP SBMRSBLE 8.0KW 1000V | PMP SBMRSBL | s2 | 3348.97 | 2 | |
| 1 | PUMP SUBMERSIBLE 8.0KW HT 1000V FLYGT | PMP SBMRSBL FLIT | s1 | 2046.12 | 2 | |
| 4 | OIL HYDRAULIC HV1100 BULK 2536000 | OIL HIDRLK BLK | s4 | 3513.75 | 4 | |
| 5 | ADAPTER PLASSON 110MM F X 4.00IN FLANGE | ADPTR PLXN FLNG | s5 | 110.03 | 5 | |
| 6 | COUPLING PLASSON 63MM FXF | CPLNG PLXN | s6 | 58.69 | 6 | |
| 7 | BUSH 20803308 TAMROCK | BUX TMRK | s6 | 74.1 | 7 | |
| 8 | GREASE CEPLATTYN KG10HMF1000 BULKA BIN | GRS CPLTIN BLK BIN | s7 | 4289.05 | 8 | |
| 9 | OIL POWERGEAR 25L DRUM | OIL PWRGR DRM | s7 | 35.69 | 9 | |
| 10 | BOLT HEX M16 X 120MM 2.00P GR8.8 BLACK | BLT HEX BLK | s8 | 17.54 | 10 | |
| 11 | BOLT HEX M20 X 100MM 2.50P GR8.8 BLACK | BLT HEX BLK | s8 | 62.85 | 10 | |
| 12 | HEX BOLT M16 X 50MM 2.00P GR8.8 NO NUT | HEX BLT NUT | s8 | 41.46 | 10 | |
| 13 | HEX BOLT M12 X 50MM 1.75P GR8.8 NO NUT | HEX BLT NUT | s8 | 270.82 | 10 | outlier |
| 14 | HAMMER WELDER S CHIPPING SPRING HANDLE | HMR WLDR XPNG SPRNG HNDL | s9 | 20.46 | 14 | |
| 15 | BUCKLE BAND-IT STRAP 5/8IN 201SS BOX/100 | BKL BND STRP | s9 | 23.64 | 15 | |
| 16 | COUPLING MINSUP SURELOCK MALE 25MM | CPLNG MNSP SRLK ML | s10 | 52.84 | 16 | |
| 17 | FLUID AUTO TRANSMISION BULK | FLUD ATO TRNSMXN BLK | s10 | 1802.9 | 17 | |
| 3 | FLUID AUTO TRANSMISSION/HYD TO-430 BULK | FLUD ATO TRNSMXN HID BLK | s3 | 4891.14 | 17 | |
| 19 | SCREW SKT M16 2.00P | SKRW SKT | s11 | 190.32 | 19 | |
| 18 | SCREW SKT HD CSK M16 2.00P 50MM LG 12.9 | SKRW SKT CSK | s11 | 167.81 | 19 | |
| 20 | PAINT DYMARK SPRAY WRITER YELLOW 360DEG | PNT DIMRK SPRI WRTR YLW DEG | s11 | 23.88 | 20 | |

FIGURE 5F

Cluster Statistics:

| No. of spend items | 20 |
|---|---|
| Total Spend | 21042.06 |
| Total no. of clusters formed | 15 |
| No. of clusters covering 90% of total spend | 6 |

FIGURE 6

SPEND DATA CLUSTERING ENGINE WITH OUTLIER DETECTION

BACKGROUND

This invention relates, in general, to processing data. More particularly, this invention relates to grouping of database entries and detection of outliers.

In a business environment, companies need to control and optimize the money they spend. The companies also need to determine the areas in which costs can be cut in order to save money for the company. Therefore, the management of payables referred to as spend items herein over a period of time is required.

When an organization procures a product or service, an entry of the spend item is made into a table known as a spend table. The spend table comprises record identifiers, item descriptions, supplier names and spend amount. For the management and analysis of spend data over a period of time, similar spend items in the spend database need to be grouped together in the form of clusters.

Furthermore, since the spend items are entered in the spend table manually, the item descriptions of the spend items may be entered inaccurately. The item descriptions may be represented in an unstructured manner, or with spelling mistakes, with non-standard abbreviations, arbitrary symbols, numeric values, etc.

In some cases, two entirely different items may have the same item description, for example, "Notebook of price $2" and "Notebook of price $1000". By considering merely the item descriptions, both the spend items will be inadvertently grouped into one cluster. Moreover, due to human mistakes or fraud, there may be a discrepancy in the spend data. To detect discrepancies in the spend data, suspicious items, namely outliers, are determined and made apparent to the user.

Spend data is critical to a company and high accuracy is required for the grouping, whereas at other times moderate accuracy is acceptable. Therefore, configurable accuracy levels of grouping are required. To determine the distribution of a company's total spend among various clusters, manual verification of the clusters is required. Further, human effort is required to determine the clusters covering a predetermined fraction of the total spend.

Hence, there is a need for a computer implemented method and system for efficient spend management and outlier detection in a company with minimum or no human intervention.

SUMMARY

The computer implemented method and system disclosed herein addresses the need for efficient spend management and outlier detection in a company with minimum or no human intervention. The above stated need is addressed by effectively grouping spend items at desired accuracy levels, and automatically detecting outliers.

The computer implemented method and system disclosed herein groups similar spend items from a list of spend items. The spend items comprising record identifiers, item descriptions, supplier names, and spend amount are entered into a spend table. The sound code for each word of the spend items is generated by a modified metaphone algorithm. The spend items are then phonetically sorted based on the sound codes. The grouping of the spend items takes place in two levels of clustering. The first level clusters are obtained by matching the item descriptions and corresponding sound codes. The inaccuracies resulting from spelling mistakes and pronunciation errors of the item descriptions are resolved during matching of the spend items. A list of unique spend items is generated, wherein each unique spend item represents a first level cluster, and further matching of unique spend items takes place to create second level clusters. The first level clusters are then updated based on matching at the second level of clustering. The spend data clustering engine returns clusters at configurable levels of accuracy. For example, the accuracy levels can be configured as High, Medium and Low. Based on the supplier names, the outliers are then detected in order to determine discrepancies in clustering and spend. The outliers are detected by comparing statistical deviation of prices of spend items within a second level cluster with the central tendency of the respective second level cluster. A brief summary of the clusters is then generated to summarize the results of clustering and to determine the minimum number of clusters that cover a desired fraction of the total spend.

In the computer implemented method and system disclosed herein, resolution of clustering may be set by selectively performing one or more of first level or second level clustering. The computer implemented method and system disclosed herein further provides clustering at different levels of accuracy depending on the need of the user.

In the computer implemented method and system disclosed herein, discrepancies in clustering and fraudulent spend may be determined by detecting the outliers. Furthermore, the cluster statistics summary provided by the computer implemented method and system disclosed herein helps to minimize the manual verification required to determine the distribution of a company's total spend among various clusters, and also minimizes the human effort required to determine the clusters covering a predetermined fraction of the total spend.

BRIEF DESCRIPTION OF THE DRAWINGS

The foregoing summary, as well as the following detailed description of the embodiments, is better understood when read in conjunction with the appended drawings. For the purpose of illustrating the invention, exemplary constructions of the invention are shown in the drawings. However, the invention is not limited to the specific methods and instrumentalities disclosed herein.

FIG. 3A illustrates an exemplary algorithm of first level clustering.

FIG. 3C exemplarily illustrates a method of determining the similarity between two item descriptions based on the word tokens.

FIG. 3D exemplarily illustrates a method of determining the similarity between two item descriptions by resolving inaccuracies resulting from spelling mistakes and pronunciation errors.

FIG. 3E illustrates an exemplary algorithm of second level clustering.

FIG. 4 illustrates an exemplary algorithm of outlier detection.

FIGS. 5A to 5F exemplarily illustrate an example of clustering and outlier detection.

FIG. 6 exemplarily illustrates the cluster statistics summary of the clusters.

DETAILED DESCRIPTION OF THE DRAWINGS

Figure 1:
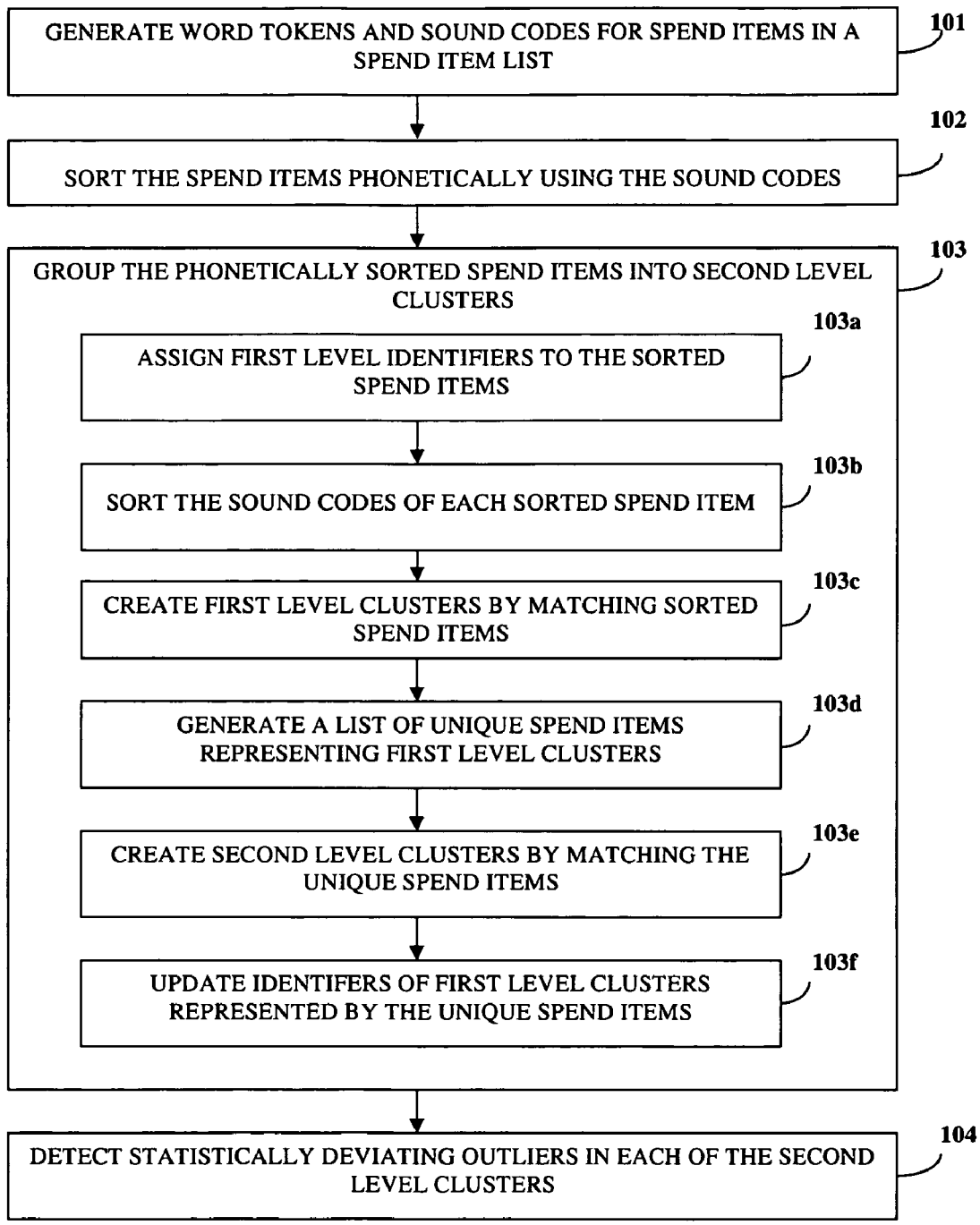
FIG. 1 illustrates a method of grouping spend items in a list of spend items and thereafter detecting outliers.

FIG. 1 illustrates a method of grouping spend items in a list of spend items and thereafter detecting outliers. The spend items are entered into a spend table with their record identifiers, item descriptions, supplier names and spend amount. Word tokens and sound codes are generated 101 for each item description and supplier name in the spend item list. The sound codes are generated using a modified metaphone algorithm. The item descriptions are sorted 102 phonetically based on the generated sound codes. The phonetically sorted spend items are then grouped 103 into two levels of clusters. In the first level of clustering, first level identifiers are assigned 103a to the spend items. The first level identifiers are the record identifiers of the spend items. The sound codes of the item descriptions are then sorted 103b, and first level clusters are created 103c by matching the spend items using the word tokens and sorted sound codes. The inaccuracies resulting from spelling mistakes and pronunciation errors of the item descriptions are resolved during matching of the spend items. The spend items may be matched at a desired accuracy level of clustering and a matching score threshold may be set depending on the chosen accuracy level. The matched spend items are now updated with a common second level identifier. During the matching process, a list of unique spend items is generated 103d, wherein each unique spend item represents a first level cluster. These unique spend items are further matched using the word tokens and sound codes in order to create second level clusters 103e. The second level identifiers of the newly matched spend items are now updated with a common third level identifier. As a result, the first level clusters represented by the unique spend items are updated 103f with the third level identifiers assigned at the second level of clustering. In order to determine discrepancies in clustering, for example to detect fraudulent spend, outliers are detected 104 in each of the second level clusters by comparing the statistical deviation of a spend item's price with the central tendency of the respective second level cluster. A brief summary of the clusters is generated to summarize the results of clustering and to determine the minimum number of clusters that cover a desired fraction of the total spend.

Figure 2:
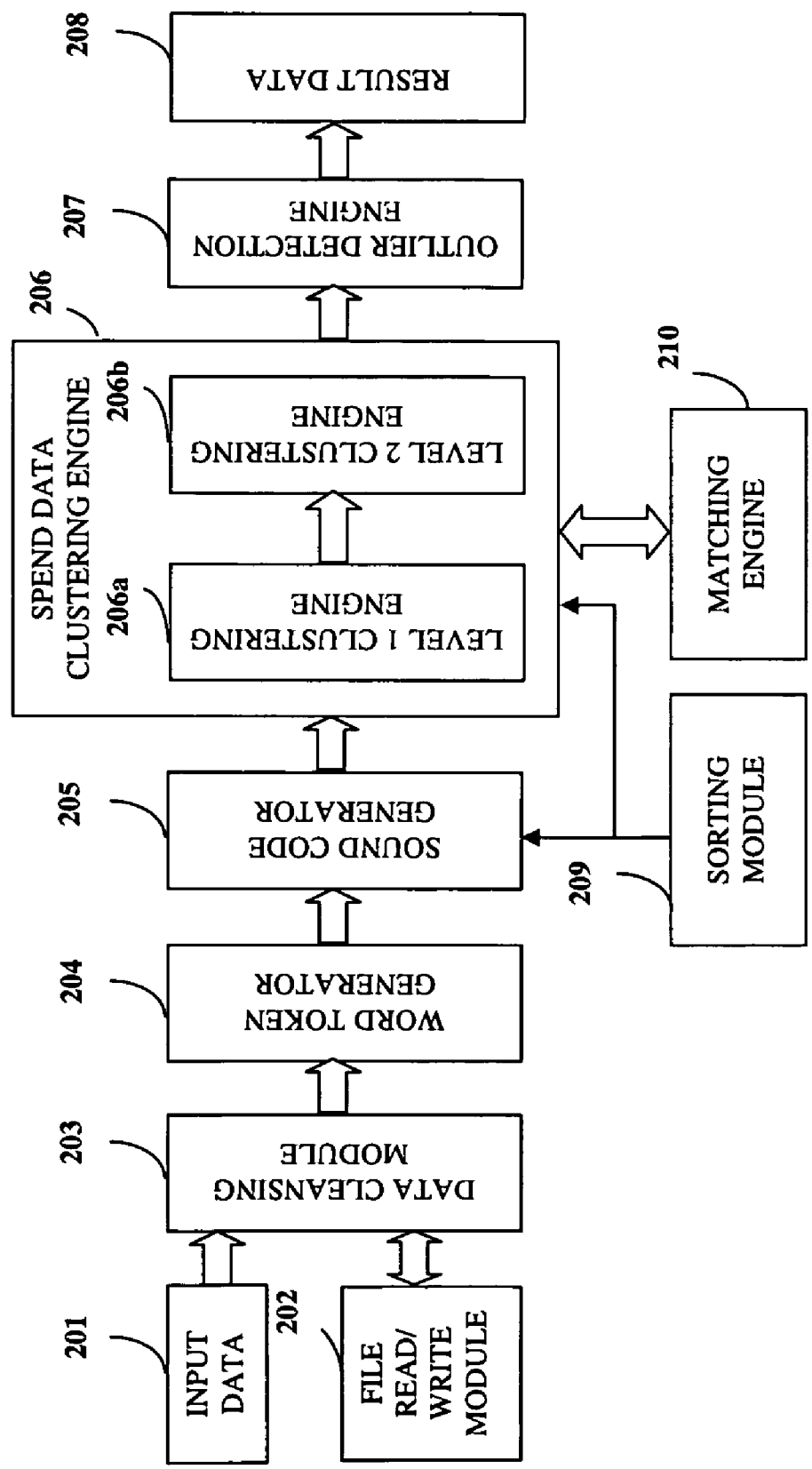
FIG. 2 illustrates a spend data clustering engine.

FIG. 2 illustrates a spend data clustering engine 206. The input data 201 consisting of a spend item list is entered into a spend table using a file read/write module 202. The input data 201 may be in any machine readable format or any machine readable database, e.g. XLS file, text file, doc file, oracle data, mysql, db2, access db, etc. The spend items entered into a spend database are given original record identifiers (IDs). The data cleansing module 203 refines the item descriptions and the supplier names of the spend items by cleansing the spend items. Exemplarily, cleansing of the spend items may comprise the following steps: Firstly, all the occurrences of "and" in the supplier names are replaced with "&". The occupancy usages of apostrophe are also removed. For example, consider an entry: Peter's laptop. The cleansing module removes the apostrophe to make the entry: Peter laptop. The numeric and non-numeric words of the supplier names and item descriptions are separated. For example, consider the entry: abc123. The words are separated to make the entry: abc 123. The supplier names and item descriptions are then tokenized based on separators using a word token generator 204. If any non-numeric word token has a length of more than 4 units, the number stem of the word token is found using a number stemmer algorithm. The number stemmer algorithm converts plurals of the word tokens into singulars. The numeric word tokens of the supplier names and item descriptions may be ignored. Unit symbols, for example mm, cm, etc., in the item descriptions may also be ignored. If the word tokens of the supplier names belong to a predetermined list of stop words, namely a NameStopWords list, such word tokens of the supplier names may be ignored. Similarly, if the word tokens of the item descriptions belong to a GeneralStopWords list, then such word tokens of the item descriptions may be ignored. The remaining word tokens are added using a single space between the word tokens to form refined supplier names and item descriptions for clustering.

For example, the NameStopWords list may consist of the following words: group, parking, inc, incorp, incorpor, incorporated, incorporation, llc, llp, ltee, liability, plc, international, tech, technology, srv, serv, srvc, service, corp, corporation, corporated, supp, supply, sply, pty, pvt, private, ltd, limited, co, etc.

The GeneralStopWords list may consist of the following words: a, about, above, across, after, afterwards, affordable, again, against, albeit, all, almost, alone, along, already, also, although, always, among, amongst etc.

Sound codes for the cleaned item descriptions are generated using a sound code generator 205. A sound code for a word is the code generated by analyzing the pronunciation of that word. A modified metaphone algorithm is used for generating the sound codes of the words. A sorting module 209 sorts the spend items phonetically based on the sound codes of the item descriptions. The sorting module 209 sorts the spend items in the desired column in the spend database, using any suitable algorithm provided by the database, or by using the standard quick sort algorithm. The phonetically sorted spend items are then grouped into second level clusters by the spend data clustering engine 206. The grouping of spend items is agglomerative, i.e., similar spend items are grouped and the sizes of the clusters increase at each level of clustering. A desired level of accuracy of clustering is selected and a matching score threshold is then set for the selected accuracy level. For example:

If accuracy level=high
   MatchingScoreThreshold=0.75
Else if accuracy level=medium
   MatchingScoreThreshold=0.60
Else if accuracy level=low
   MatchingScoreThreshold=0.50

Figure 3B:
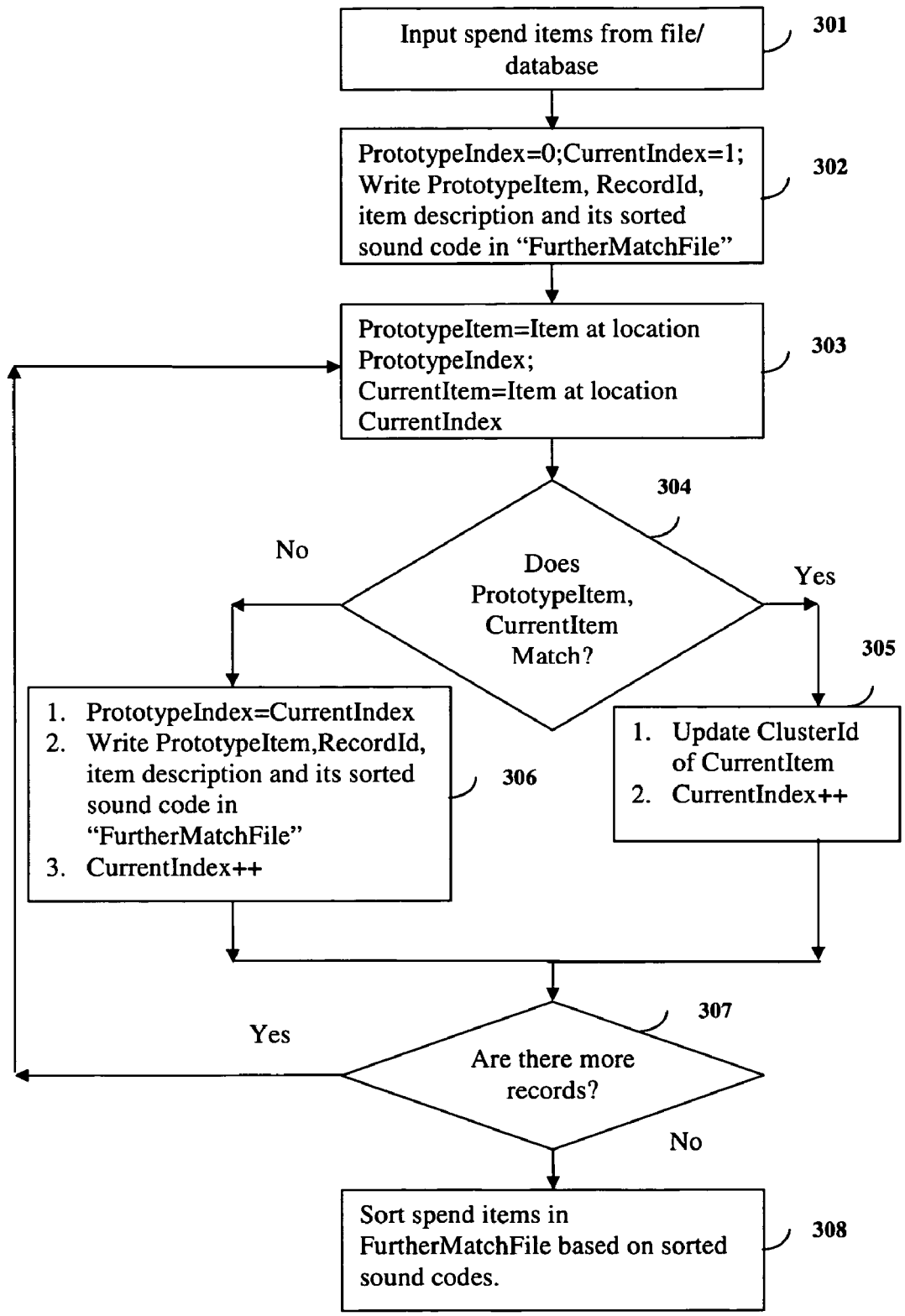
FIG. 3B illustrates an exemplary flowchart of first level clustering.

The spend data clustering engine 206 further comprises a level 1 clustering engine 206a and a level 2 clustering engine 206b. FIG. 3A illustrates an exemplary algorithm of first level clustering. The level 1 clustering engine 206a creates the first level clusters by the following steps: The record IDs of the input spend items 301 are assigned as the first level IDs for all the spend items in the sorted spend item list. The sound codes of each item description in the list are sorted using the sorting module 209. The sound codes of the item descriptions are sorted to handle order insensitivities in writing the item descriptions, for example, 'hex bolt' and 'bolt hex'. FIG. 3B illustrates an exemplary flowchart of first level clustering. The first level clustering begins with the first spend item in the spend item list by setting 302 a 'PrototypeIndex' to zero. The first spend item prototype is written 302 into a 'FurtherMatchFile' with 'PrototypeIndex' as zero. The first level clustering is started from the initial location by setting 302 the 'Current Index' to one. The 'PrototypeRecordId' of the first spend item in the 'FurtherMatchFile' is set to the record ID of the spend item at location 'PrototypeIndex'. While there are more records 307 in the list, the current item points 303 to the spend item in the spend item list at location 'Current Index' and the prototype item points 303 to the spend item in the spend list at location 'PrototypeIndex'. The current item and the prototype item are then matched by the matching engine 210 using a 'MatchingUsingTokensCriteria' algorithm. If a match 304 is found between the prototype item and the current item, the first level ID of the current item is updated 305 with a second level ID, the second level ID being the same as the 'PrototypeRecordId' of the first spend item. The 'Current Index' location is then incremented 305 by one to point to the next record in the spend item list. If a match 304 is not found between the prototype item and the current item, further matching is performed by a 'FuzzyMatch' algorithm. If a match 304 is found by the 'FuzzyMatch' algorithm, the first level ID of the current item is updated 305 with the second level ID as in the earlier case, and the 'Current Index' location is incremented 305 by one. If a match 304 is further not found by the 'FuzzyMatch' algorithm, then the 'PrototypeIndex' is set 306 to the 'Current Index' and the 'Current Index' is incremented 306 by one to point to the next spend item in the spend item list. The prototype record of the next spend item is then written into the 'FurtherMatchFile' and the entire process of matching is repeated for every spend item in the spend item list. 'Current Index' is incremented sequentially until all the unprocessed spend items in the list are compared and matched, thereby creating the first level clusters. In addition, the 'FurtherMatchFile' is generated with a list of unique spend items, in which each unique spend item represents each of the first level clusters. The unique spend items in the 'FurtherMatchFile' are further sorted 308 based on their sound codes using the sorting module 209.

FIG. 3C exemplarily illustrates a method of determining the similarity between two item descriptions based on the word tokens. The method is implemented by using the 'MatchingUsingTokensCriteria' algorithm. The 'MatchingUsingTokensCriteria (ItemDesc1, ItemDesc2)' algorithm matches two spend items in the spend item list based on word tokens, where 'ItemDesc1' is the unprocessed prototype item description in the location 'PrototypeIndex', and 'ItemDesc2' is the unprocessed current item description in the location 'Current Index'. 'ItemDesc1' and 'ItemDesc2' are parsed using a delimiter. If the item descriptions have only one word token each, the word tokens are compared and matched. If more than one word token exists, then the following steps may be performed to achieve a desired accuracy level is performed for the desired accuracy level. There may be a plurality of accuracy levels. For example, if the accuracy level is 'low', then in order to find a match, the first two word tokens of both the item descriptions need to be identical. If the accuracy level is 'medium', then the first two word tokens and at least one of remaining word tokens of both the item descriptions need to be identical for a match. And if the accuracy level is 'high', then either the first three word tokens, or the first two word tokens and at least two of the remaining word tokens of both the item descriptions need to be identical for a match to be found.

FIG. 3D exemplarily illustrates a method of determining the similarity between two item descriptions by resolving inaccuracies resulting from spelling mistakes and pronunciation errors. The method is implemented by using the 'FuzzyMatch' algorithm. The 'FuzzyMatch' algorithm is used for further matching, when a match is not found between 'ItemDesc1' and 'ItemDesc2' by the 'MatchingUsingTokensCriteria' algorithm. The inaccuracies resulting from spelling mistakes and pronunciation errors of the item descriptions are resolved in the 'FuzzyMatch' algorithm by calculating a matching score based on sound codes, length of item descriptions, prefix matching lengths, and Levenshtein Distance. The fuzzy match is performed by calculating the matching score using Levenshtein Distance and prefix matching algorithms. In the 'FuzzyMatch (ItemDesc1, ItemDesc2, SoundCode S1, SoundCode S2)' algorithm, 'ItemDesc1' is the unprocessed prototype item description in the location 'PrototypeIndex', 'ItemDesc2' is the unprocessed current item description in the location 'Current Index', and 'S1' and 'S2' are the sound codes of the respective item descriptions. 'ItemDesc1' and 'ItemDesc2' are first compared to find a match. If the length of either item description is found to be less than 4, the item descriptions are considered unmatched. Then, the Levenshtein Distance (LD) of the sound codes 'S1' and 'S2', the prefix score and sound score are found. Levenshtein Distance is the measure of the similarity between two strings. It determines the minimum number of insertions, deletions, or substitutions of a single character required to convert one string into another. For example, the Levenshtein Distance between the strings 'test' and 'trial' is four. This is obtained as follows:
 1. test-trest (insertion of 'r')
 2. trest-trist (substitution of 'e' with 'i')
 3. trist-triat (substitution of 's' with 'a')
 4. triat-trial (substitution of 't' with 'l')

Therefore, the above four operations result in a Levenshtein Distance of four units. The prefix score may be the length of matching prefixes of both the item descriptions or the length of the larger item description. The sound score is the length of matching prefixes of the sound codes of both item descriptions. The Levenshtein Distance score (LDScore) is then calculated as follows:

$$LDScore = 1 - 2*LD/\text{length of the larger item description}.$$

A final score is then calculated by considering the maximum of the prefix score, sound score and LDScore. A match between the two spend items is found if the final score is found to be greater than the 'MatchingScoreThreshold' configured while setting the accuracy level.

Figure 3F:
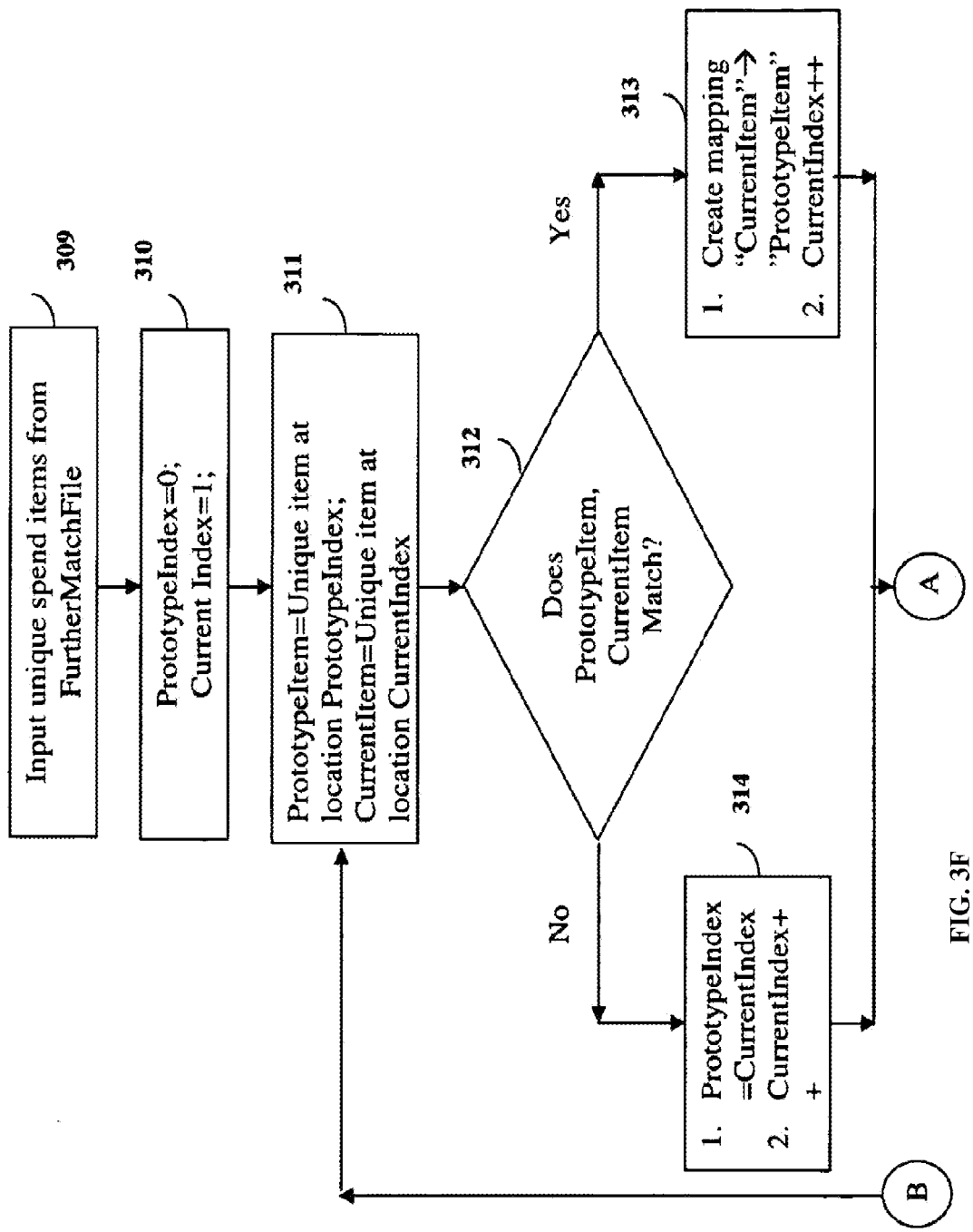
FIGS. 3F to 3G illustrate an exemplary flowchart of second level clustering.
Figure 3G:
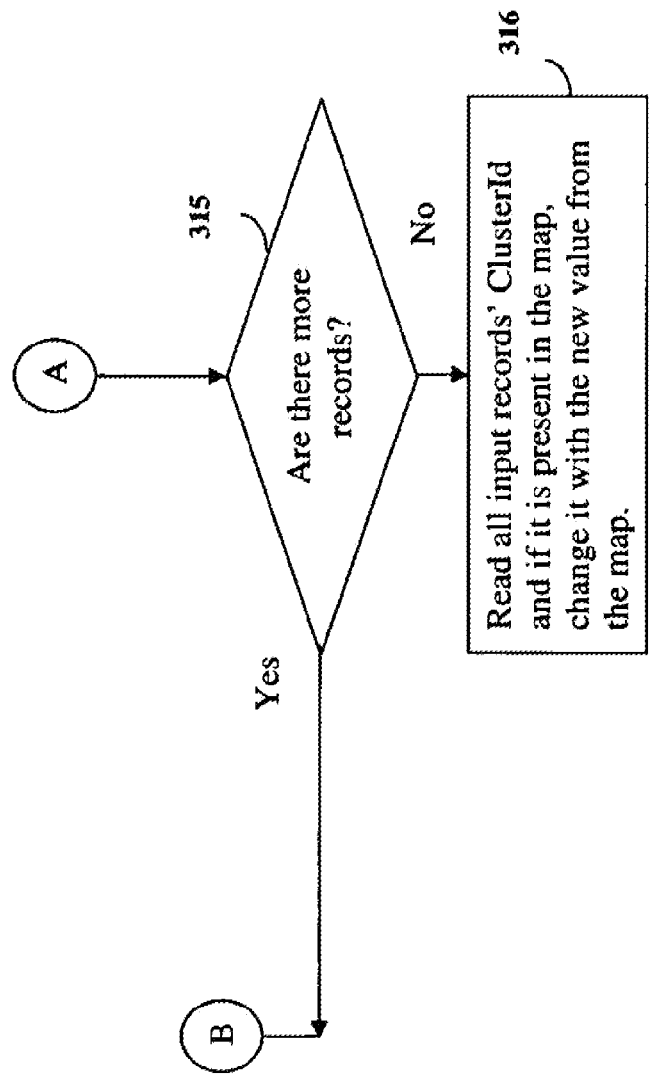

FIG. 3E illustrates an exemplary algorithm of second level clustering. The sorted unique spend items in the 'FurtherMatchFile' generated at the end of first level clustering are further clustered into second level clusters by the level 2 clustering engine 206b. FIGS. 3F to 3G illustrate an exemplary flowchart of second level clustering. The sorted unique spend items in the 'FurtherMatchFile' generated at the end of first level clustering are used as input 309 for second level clustering by the level 2 clustering engine 206b. The second level clusters are created by the following steps.

The second level clustering begins with the first unique spend item in the 'FurtherMatchFile' by setting 310 the 'PrototypeIndex' to zero. The clustering is started from the initial location in the 'FurtherMatchFile' by setting 310 the 'Current Index' to one. While there are more records 315 in the list, the current item points 311 to the unique spend item at location 'Current Index' and the prototype item points 311 to the unique spend item at location 'PrototypeIndex'. The current item and the prototype item are then matched by the matching engine 210 using the 'MatchingUsingTokensCriteria' algorithm. If a match 312 is found between the current item and the prototype item, a map entry is created 313 with the second level ID (CurrentItemRecordId) of the current item, obtained after first level clustering, pointing to a third level ID, wherein the third level ID will be the 'PrototypeRecordId' of the first unique spend item. The 'Current Index' location is then incremented 313 by one to point to the next record in the 'FurtherMatchFile'. If a match 312 is not found, further matching is performed by a 'FuzzyMatch' algorithm. If a match 312 is found by the 'FuzzyMatch' algorithm, a map is created 313 with the second level ID of the current item pointing to the third level ID as in the earlier case, and the 'Current Index' location is incremented 313 by one. If a match 312 is further not found by the 'FuzzyMatch' algorithm, then the 'PrototypeIndex' is set 314 to the 'Current Index' and the 'Current Index' is incremented 314 by one to point to the next unique spend item and the entire process of matching is repeated for every unique spend item in the 'FurtherMatchFile'. 'Current Index' is incremented sequentially until all the unprocessed unique spend items in the 'FurtherMatchFile' are compared and matched, thereby creating the second level clusters. The input records in the spend item list are then read 316 by the file read/write module 202 and if these records are found in the map created at the second level of clustering, the first level IDs are updated with the corresponding third level IDs from the map. The spend items in the list are then sorted based on third level IDs by the sorting module 209, thus providing the result data 208.

FIG. 4 illustrates an exemplary algorithm of outlier detection. The second level clusters obtained by the level 2 clustering engine 206b are inputted to the outlier detection engine 207. The outlier detection engine 207 detects statistically deviating outliers in each of the second level clusters in order to determine discrepancies in clustering or spend. The outliers are detected on a supplier basis by the following steps. Firstly, the central tendency of spend item prices of each of the second level clusters is determined. Exemplarily, the central tendency may be one of a mean, a median and a mode. Then, thresholds for 'frequent' and 'non-frequent' suppliers are set. These thresholds may be configured externally. Each spend item in the second level clusters are traversed and the following steps are performed for each item. Each supplier's frequency fraction is calculated and compared with a predetermined value. If the frequency fraction is found to be greater than the predetermined value, the price of the spend item is compared with the central tendency of second level cluster to which the spend item belongs. A spend item is considered an outlier if a fraction determined by the price and central tendency is found to be greater than the preset 'frequent' supplier threshold. If the frequency fraction is found to be lesser than the predetermined value, the spend item is considered an outlier, if a fraction determined by the price and central tendency is found to be greater than the preset 'non-frequent' supplier threshold.

FIGS. 5A to 5F exemplarily illustrate an example of clustering and outlier detection. FIG. 5A illustrates the input data 201 entered into a spend table. The spend items are entered with their record identifiers, item descriptions, supplier names and spend amount. FIG. 5B illustrates the spend item list after first level clustering along with their respective sorted sound tokens and updated second level IDs. FIG. 5C illustrates the sorted unique spend items found in the "FurtherMatchFile" after the first level of clustering. FIG. 5D illustrates the unique spend items after second level clustering along with their respective updated third level IDs. FIG. 5E illustrates the final updated spend item list sorted according to the third level IDs. FIG. 5F illustrates the final spend item list along with the detected outliers.

Consider record 10 'BOLT HEX M16×120 MM 2.00 P GR8.8 BLACK' of the input data 201. In FIG. 5B, after first level clustering, the cluster ID of record 11 'BOLT HEX M20×100 MM 2.50 P GR8.8 BLACK' has been updated from '11' to '10' due to matching of the sound codes 'BLK BLT HEX'. In FIG. 5C, only record 10 has been included for second level clustering. In FIG. 5D, the cluster ID of record 12 'HEX BOLT M16×50 MM 2.00 P GR8.8 NO NUT' has been updated to '10' due to a match found between the sound code 'BLK BLT HEX' of record 10 and the sound code 'BLT HEX NUT' of record 12. Finally, since record 12 has been matched with record 13 'HEX BOLT M12×50 MM 1.75 P GR8.8 NO NUT' at the first level of clustering, the cluster ID of record 13 gets further updated from '12' to '10'. Therefore, a second level cluster with cluster ID '10' is created with the records 10, 11, 12 and 13 as shown in FIG. 5E. Record 13 was found to be an outlier and hence flagged as one in FIG. 5F.

FIG. 6 exemplarily illustrates the cluster statistics summary of the clusters. A cluster statistics summary is generated after clustering and outlier detection in order to display the following to the user: the number of spend items in the spend data list, the total spend of the spend items, the number of clusters formed, and the minimum number of clusters that cover a desired fraction of said total spend.

The method and system herein has been described in the context of processing and clustering of spend item related information, and detecting outliers in a spend database. It will be readily apparent to those skilled in the art that the same method and system herein can be extended to process and cluster any type of human readable and intelligible data encompassing different databases.

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, Central Processing Unit (CPU) devices, computing devices, microcontrollers, digital signal processors, or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during Radio Frequency (RF) and Infrared (IR) data communications. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

Where databases are described, such as the 'spend' database, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel®, Pentium®, or Centrino™ processors, that are adapted to communicate with the computer. Any number and type of machines may be in communication with the computer.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A computer implemented method of grouping spend items in a list of said spend items and detecting outliers, comprising the steps of:
    generating word tokens and sound codes for the spend items in said spend item list;
    phonetically sorting the spend items using said sound codes;
    grouping said phonetically sorted spend items into second level clusters, comprising the steps of:
        assigning first level identifiers to the sorted spend items;
        sorting the sound codes of each sorted spend item;
        creating first level clusters by matching sorted spend items using said word tokens and said sorted sound codes, whereby said first level identifiers of said matched spend items are updated with a common second level identifier;
        generating a list of unique spend items, wherein each of said unique spend items represents each of said first level clusters;
        creating said second level clusters by matching the unique spend items using the word tokens and sound codes, whereby said second level identifiers of matched unique spend items are updated with a common third level identifier;
        updating the first level clusters represented by the unique spend item with said third level identifier; and
    detecting statistically deviating outliers in each of the second level clusters, wherein said step of detecting outliers comprises determining central tendency of prices of spend items within each of the second level clusters, wherein said central tendency is one of a mean, a median and a mode;
    whereby discrepancies in clustering and spend data are determined by grouping the spend items into the second level clusters and detecting the outliers in each of the second level clusters.

2. The computer implemented method of claim 1, wherein said step of generating the sound codes for each spend item is performed by using a modified metaphone algorithm.

3. The computer implemented method of claim 1, wherein said step of grouping is agglomerative and the second level clusters are normalized in the form of a table.

4. The computer implemented method of claim 1, wherein said step of matching comprises setting a matching score threshold for a predetermined accuracy of clustering.

5. The computer implemented method of claim 1, wherein said step of matching further comprises resolving inaccuracies resulting from spelling mistakes and pronunciation errors of the item descriptions of the spend items.

6. The computer implemented method of claim 1, wherein said step of matching further comprises calculating a matching score by using string matching criteria, wherein said string matching criteria comprises lengths of the word tokens in item descriptions, Levenshtein distance score, and prefix matching score.

7. The computer implemented method of claim 1, wherein said step of detecting outliers is performed on a supplier basis.

8. The computer implemented method of claim 1, wherein said step of detecting outliers further comprises setting thresholds for frequent and non-frequent suppliers.

9. The computer implemented method of claim 1, wherein said step of detecting outliers further comprises comparing statistical deviation of price of a spend item with said central tendency within each of the second level clusters.

10. The computer implemented method of claim 1, wherein resolution of clustering is set by selectively performing one or more of first level and second level clustering.

11. A computer implemented system for grouping spend items in a list of said spend items and detecting possible outliers in a database, comprising one or more processors for executing one or more of:

a word token generator for generating word tokens for the spend items in said spend item list;
a sound code generator for generating sound codes for the spend items;
a sorting module for phonetically sorting spend items using said generated sound codes;
a spend data clustering engine for grouping said phonetically sorted spend items into second level clusters, using said generated word tokens and the sound codes, comprising:
  a level 1 clustering engine for creating first level clusters by performing:
    assigning first level identifiers to the sorted spend items;
    sorting the sound codes of each sorted spend item;
    matching said sorted spend items using said word tokens and said sorted sound codes, whereby said first level identifiers of said matched spend items are updated with a common second level identifier; and
    generating a list of unique spend items, wherein each of said unique spend items represents each of said first level clusters;
  a level 2 clustering engine for creating said second level clusters by performing:
    matching the unique spend items using the word tokens and sound codes, whereby said second level identifiers of matched unique spend items are updated with a common third level identifier; and
    updating the first level clusters represented by the unique spend item with said third level identifier;
an outlier detection engine for detecting statistically deviating outliers in each of the second level clusters, wherein said step of detecting outliers comprises determining central tendency of prices of spend items within each of the second level clusters, wherein said central tendency is one of a mean, a median and a mode.

12. The computer implemented system of claim 11, wherein said spend item list is one of a machine readable format, and a machine readable database.

13. The computer implemented system of claim 11 further comprising a file read/write module for reading the inputted spend items and writing the processed results to a result file.

14. The computer implemented system of claim 11, wherein said spend data clustering engine comprises a matching engine, wherein said matching engine performs matching of the word tokens, and calculates a matching score by using string matching criteria.

15. The computer implemented system of claim 14, wherein said string matching criteria comprises lengths of the word tokens in item descriptions, Levenshtein distance score, and prefix matching score.

16. A computer program product comprising computer executable instructions embodied in a non-transitory computer-readable storage medium, wherein said computer program product comprises a plurality of computer parsable codes for causing a computer to:
  generate word tokens and sound codes for spend items;
  phonetically sort said spend items using said sound codes;
  group said phonetically sorted spend items into second level clusters, further comprising:
    assign first level identifiers to the sorted spend items;
    sort the sound codes of each sorted spend item;
    create first level clusters by matching sorted spend items using said word tokens and said sorted sound codes, whereby said first level identifiers of said matched spend items are updated with a common second level identifier;
    generate a list of unique spend items, wherein each of said unique spend items represents each of said first level clusters;
    create said second level clusters by matching the unique spend items using the word tokens and said sorted sound codes, whereby the said second level identifiers of matched unique spend items are updated with a common third level identifier;
    update the first level clusters represented by the unique spend item with said third level identifier; and
  detect statistically deviating outliers in each of the second level clusters to determine discrepancies in clustering and spend data, wherein detecting outliers comprises determining central tendency of prices of spend items within each of the second level clusters, wherein said central tendency is one of a mean, a median and a mode.

17. The computer program product of claim 16 further comprising a computer parsable program code for causing said computer to resolve inaccuracies resulting from spelling mistakes and pronunciation errors of the item descriptions of the spend items.

18. The computer program product of claim 16 further comprising a computer parsable program code for causing said computer to set a matching score threshold for a predetermined accuracy level of clustering.

19. The computer program product of claim 16 further comprising a computer parsable program code for causing said computer to calculate a matching score by using string matching criteria, wherein said string matching criteria comprises length of words in item descriptions and Levenshtein distance score, and prefix matching score.

20. The computer program product of claim 16 further comprising a computer parsable program code for causing said computer to set thresholds for frequent and non-frequent suppliers.

21. The computer program product of claim 16 further comprising a computer parsable program code for causing said computer to compare statistical deviation of price of a spend item with said central tendency within each of the second level clusters.

* * * * *